United States Patent [19]

Matsui

[11] Patent Number: 5,738,179
[45] Date of Patent: Apr. 14, 1998

[54] HOOD MECHANISM FOR A WORK VEHICLE

[75] Inventor: Akio Matsui, Sakai, Japan

[73] Assignee: Kubota Corporation, Japan

[21] Appl. No.: 549,965

[22] Filed: Oct. 30, 1995

[30] Foreign Application Priority Data

Nov. 18, 1994 [JP] Japan ................. 6-283908

[51] Int. Cl.$^6$ ................................ B62D 25/10
[52] U.S. Cl. .................. 180/69.21; 180/68.6; 16/357; 16/360
[58] Field of Search ............... 180/69.21, 69.2, 180/68.6, 68.4, 89.14, 89.17; 296/76; 49/394, 395, 257; 16/357, 360, 361

[56] References Cited

U.S. PATENT DOCUMENTS

| | | | |
|---|---|---|---|
| 2,639,462 | 5/1953 | Fish | 296/76 |
| 2,952,328 | 9/1960 | Steiner | 180/69.2 |
| 3,754,614 | 8/1973 | Habas | 180/69.21 |
| 3,767,001 | 10/1973 | Chupick | 296/76 |
| 4,403,648 | 9/1983 | Styok | 180/68.6 |
| 4,530,412 | 7/1985 | Sigety, Jr. | 180/69.21 |
| 4,712,828 | 12/1987 | Albrecht | 16/361 |
| 4,750,549 | 6/1988 | Ziegler et al. | 180/68.6 |
| 5,050,270 | 9/1991 | Burgei et al. | 16/361 |
| 5,062,182 | 11/1991 | Griffiths et al. | 16/360 |

FOREIGN PATENT DOCUMENTS

| | | | |
|---|---|---|---|
| 56-42476 | 7/1979 | Japan . | |
| 61-108771 | 10/1986 | Japan . | |
| 2069037 | 8/1981 | United Kingdom | 16/357 |

*Primary Examiner*—Brian L. Johnson
*Assistant Examiner*—Gary Savitt
*Attorney, Agent, or Firm*—Webb Ziesenheim Bruening Logsdon Orkin & Hanson, P.C.

[57] ABSTRACT

A work vehicle has an engine hood which may be opened and closed. The vehicle includes a connecting mechanism for allowing the hood to be pivoted upwards after displacement of the hood in the forward or rearward direction relative to the vehicle body, and includes also a movement restricting mechanism for checking sideways and upward movements of the engine hood after the hood is closed. The connecting mechanism includes a first bracket pivotally attached to a vehicle chassis, a second bracket provided to the engine hood, and a connecting member for pivotally interconnecting the first bracket and the second bracket. The movement restricting mechanism includes an engaging portion fixedly provided to the engine hood and an engaged portion provided to the vehicle body for engaging the engaging portion.

18 Claims, 4 Drawing Sheets

HOOD MECHANISM FOR A WORK VEHICLE

BACKGROUND OF THE INVENTION

1. Field of the Invention

The present invention relates to a work vehicle such as a passenger type lawn mower, a tractor or the like. The invention relates more particularly to an engine-hood connecting construction having a mechanism for allowing an engine hood to be moved first in the fore-and-aft direction of the vehicle and then to be pivotally opened and closed.

2. Description of the Related Art

A conventional engine-hood connecting construction for a work vehicle is disclosed in e.g. Japanese laid-open utility model gazette No. 56-42476. In this, a parallelogram link mechanism is provided as a stay for pivotally supporting the engine hood, so that, by using this parallelogram link mechanism, the engine hood may be pivotally opened and closed in association with a movement thereof in the fore-and-aft direction of the vehicle body. It is sometimes desired to make an access to the inside of the engine room, to such components as a radiator or a dustproof mesh in particular, without fully opening the engine hood, i.e. with opening the hood not to the full extent but to some limited extent only. In this respect, if the parallelogram link mechanism is used as the supporting stay for supporting the engine hood to the vehicle body, in order to move and retain the engine hood to and at a position slightly displaced in the longitudinal direction of the vehicle body, this movement is necessarily accompanied by a pivotal movement of the hood. In this respect, there has been room for improvement.

On the other hand, with the conventional engine hood, as disclosed in Japanese laid-open utility model gazette No. 61-108771, the right-to-left movement of the engine hood is restricted by means of an inner face of a side wall of the hood and a guide member provided to an outer face of a hood support frame which is fixed to the vehicle body. Further, an upward pivotal movement of the hood is restricted by means of an engaging pawl type lock mechanism provided to the upper face of the engine hood.

Then, if such lock mechanisms as above for respectively and separately effecting the restriction of movement of the hood in the right and left direction and the restriction of the pivotal movement of the hood in the upward direction are used in combination with the above-described mechanism for allowing the engine hood to be moved first in the fore-and-aft direction of the vehicle and then to be pivotally opened and closed, the restriction of the movement of the hood in the right and left direction and the restriction of the pivotal movement of the hood in the upward direction need to be effected separately from each other. In addition, a great number of components are needed for fixing, supporting and allowing the movements of the engine hood, whereby the manufacture costs are increased.

As described above, there has been room for improvement also for allowing an engine hood to be retained at an intermediate position before the full opened position and also for simplifying the construction for locking the engine hood at the closed position.

SUMMARY OF THE INVENTION

For solving the above-described inconveniences, according to the present invention, in a work vehicle having an engine hood which may be opened and closed, the vehicle includes a connecting mechanism for connecting the engine hood with a vehicle body in such a manner as to allow the engine hood to be moved in the forward or rearward direction relative to a vehicle body and then to allow an upward pivotal movement of the engine hood relative to the vehicle body after the engine hood has reached a maximum displaced position in the forward or rearward direction of the vehicle body. The connecting mechanism includes a first bracket pivotally attached to a vehicle chassis, a second bracket provided to the engine hood, and a connecting member for pivotally interconnecting the first bracket and the second bracket.

With the above construction, the access to the components housed in the engine room is enabled simply by moving the engine hood in the forward/rearward direction, without having to open the hood to the full extent.

In particular, if a dustproof mesh for a radiator is disposed in the vicinity of an opened side of the engine hood, this dustproof mesh may be detached simply by slightly opening the engine hood in the forward or rearward direction. Accordingly, a cleaning operation of the dustproof mesh may be effected conveniently and efficiently.

According to a further aspect of the invention, the vehicle further comprises a movement restricting mechanism for restricting movements of the engine hood under the closed condition in the right and left and upward directions relative to the vehicle body, the movement restricting mechanism includes an engaging portion fixedly provided to the engine hood and an engaged portion provided to the vehicle body for restricting movements of the engaging portion in the right and left and upward directions relative to the vehicle body.

With the above-described construction, the restriction of the movement of the engine hood in the right and left direction and the restriction of the pivotal movement of the engine hood in the upward direction are effected by the engaging portion of the engine hood and the engaged portion of the vehicle body. Thus, it becomes unnecessary to provide independent mechanisms for effecting these restrictions separately. As a result, the number of components may be reduced.

Further and other objects, features and effects of the invention will become more apparent from the following more detailed description of the embodiment of the invention with reference to the accompanying drawings.

DESCRIPTION OF THE PREFERRED EMBODIMENT

A passenger type front-mount lawn mower according to one preferred embodiment of the invention will now be described in details with reference to the accompanying drawings.

Figure 1:
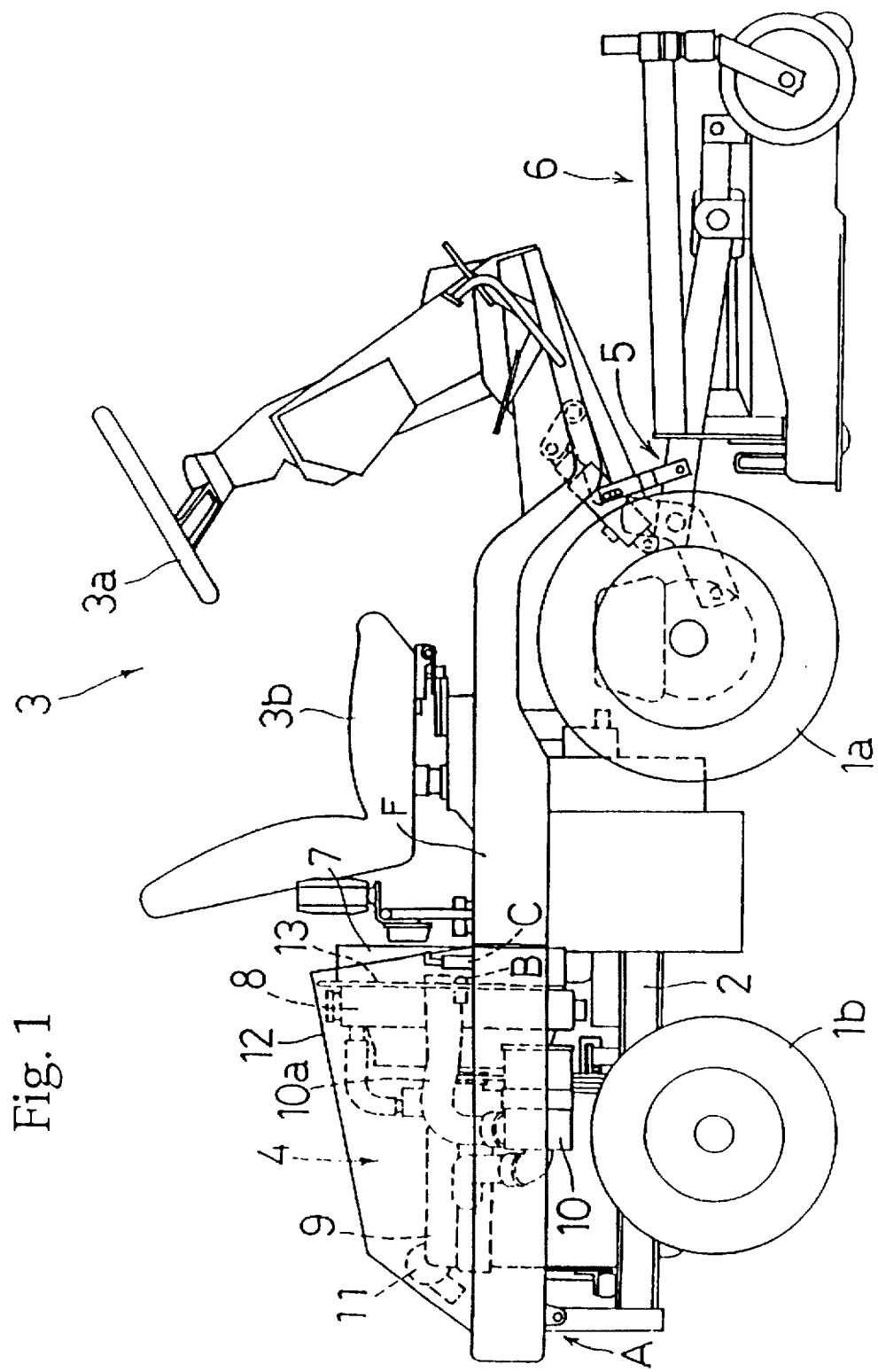
FIG. 1 is a side view showing a passenger type lawn mower in its entirety.

FIG. 1 shows the passenger type front-mount lawn mower in its entirety. This lawn mower includes: a chassis 2 mounting a pair of right and left steerable front wheels 1a and a pair of right and left driving rear wheels 1b; a driver's section 3 mounted on a front portion of the chassis 2 and including a steering wheel 3a and a driver's seat 3b; and an engine unit 4 mounted on a rear portion of the chassis 2. Further, at a forward end area of the vehicle, a mower device 6 is mounted via a lift link mechanism 5.

In the engine unit 4, a radiator 8 having a box-shaped dustproof mesh 7 at a front face thereof is disposed rearwardly of the driver's seat 3b. An engine 9 is disposed rearwardly of the radiator 8. Further, an air cleaner 10 is disposed on the right under the engine 9 and a muffler 11 is disposed behind the engine 9, respectively. All these components are covered with an engine hood 12 having an opened front face.

A shield plate 13 is provided to fill a gap formed between the engine hood 12 and the radiator 8, and a leading end of an air intake pipe 10a of the air cleaner 10 is connected to this shield plate 13.

Figure 2:
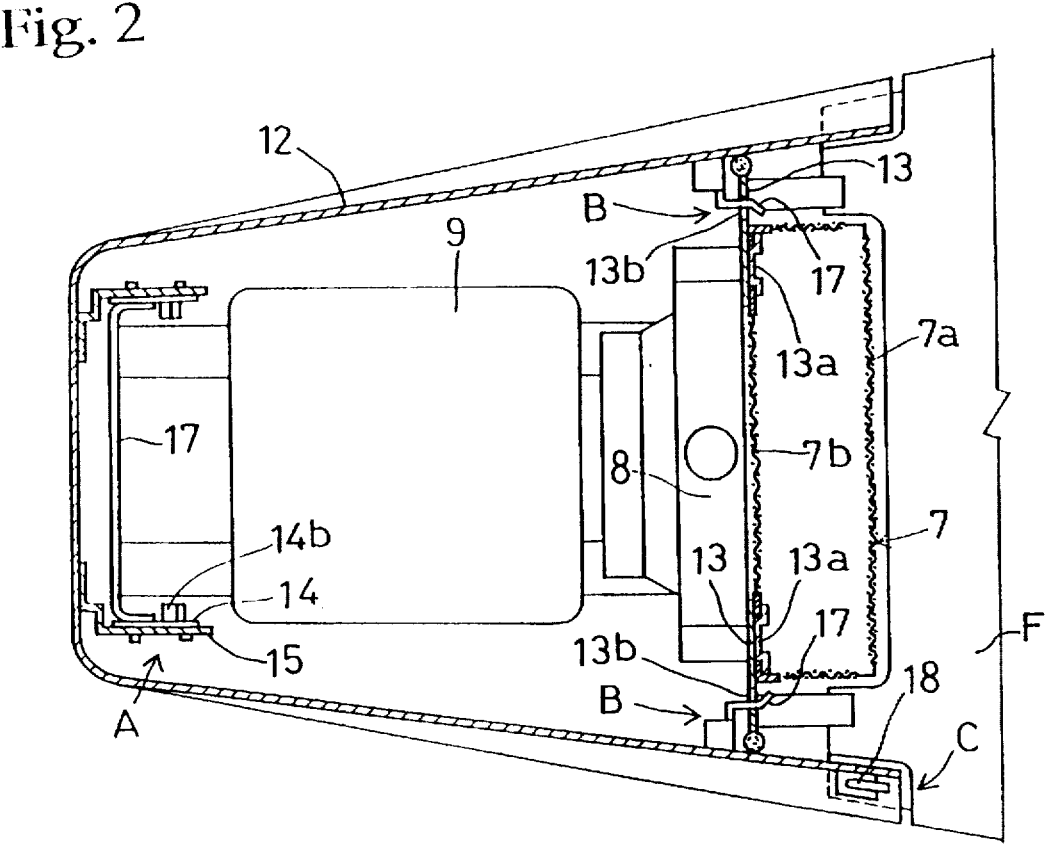
FIG. 2 is a plan view in a horizontal section of an engine room of the lawn mower.
Figure 3:
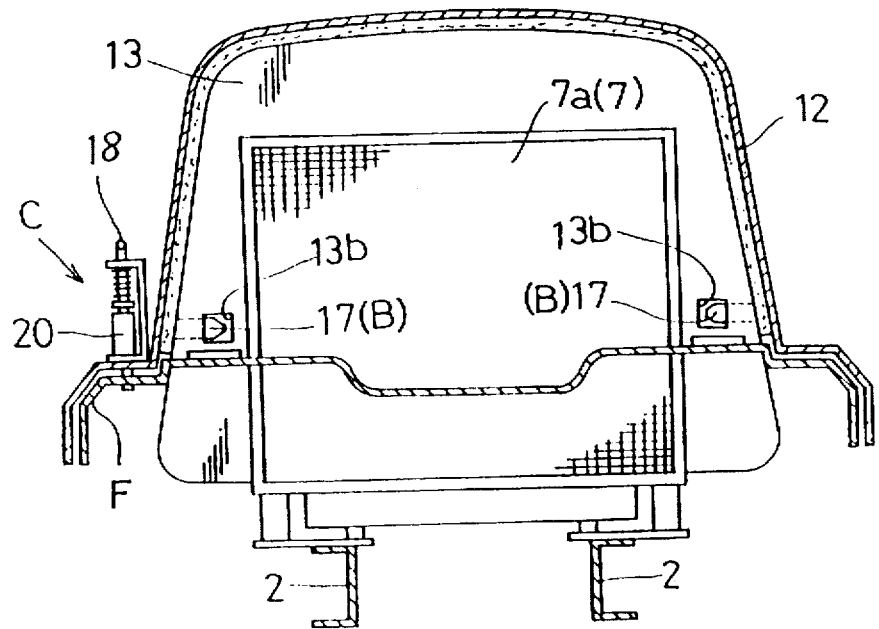
FIG. 3 is a plan view in a horizontal section of the engine room.

As shown in FIGS. 2 and 3, the box-shaped dustproof mesh 7 includes a box-shaped front mesh portion 7a integrally forming an upper face, right and left side faces and a bottom face, and a rear mesh portion 7b separated from the front mesh portion 7a. And, these mesh portions 7a, 7b are upwardly withdrawable along a pair of right and left guide rails 13a, 13a provided to the front face of the shield plate 13.

As shown in FIG. 4, the engine hood 12 is connected to the vehicle chassis 2 via a connecting mechanism A which allows the hood 12 to be moved first substantially in the fore-and-aft direction of the vehicle body and then allows the hood 12 to be pivotally opened and closed.

Next, this connecting mechanism A will be particularly described. The connecting mechanism A includes a pair of right and left hood support arms 14, 14 (corresponding to 'first brackets') which are pivotally attached to a rear end of the vehicle chassis 2, and a bracket 15 (corresponding to 'a second bracket') having a hook-like shape in the plan view and provided or attached to an inner face of the rear end of the engine hood 12, the hood support arms 14, 14 being pivotally attached to the bracket 15 via connecting pins 16, 16 (each corresponding to 'a first engaging pin'). The bracket 15 defines a pair of arcuate elongate slots 15a each extending peripherally about the corresponding connecting pin 16. On the other hand, the hood support arm 14 includes, on an outer side face thereof, a pivot-restricting pin 14a corresponding to 'a second engaging pin') engageable into the corresponding arcuate elongate slot 15a. The support arm 14 further includes a stopper 14b which comes into contact with a bent element 2a (corresponding to 'a contact portion') provided at the rear end of the vehicle chassis 2 when the support arm 14 is pivoted rearwardly.

Next, opening and closing conditions of the engine hood 12 will be detailed For opening this engine hood 12, first, the engine hood 12 is moved to the rear side of the vehicle body. With this, each support arm 14 is pivoted about a horizontal axis P until the stopper 14b thereof comes into contact with the bent element 2a provided at the rear end of the chassis 2 to restrict further rearward movement of the hood 12 (the condition shown in FIG. 4b). Here, the stopper 14b and the bent element 17 together constitute a maximum forward-rearward displacement restricting means. Further, this particular position of the engine hood 12 relative to the vehicle body when the bent element 17 and the stopper 14b are in contact with each other, will be referred to as a maximum displaced position in the fore-and-aft direction of the vehicle body (or, the maximum forward-rearward displaced position). In this construction, preferably, an inter-center distance between the pivot axis P of the support arm 14 and the connecting pin 16 and an angular position of the belt element 17 relative to the pivot axis P are appropriately determined so as to allow an upward withdrawal of the dustproof mesh 7 of the radiator 8 when the engine hood 12 is moved to the maximum forward-rearward displaced position described supra. Then, from this maximum forward-rearward displaced position, as the engine hood 12 is pivoted about the connecting pins 16, a distal end of each elongate slot 15a of the bracket 15 comes into contact with the corresponding pivot-restricting pin 14a of the support arm 14, thereby to restrict further rearward pivotal movement of the engine hood 12 (the condition shown in FIG. 4c). Here, the pivot-restricting pin 14a and the elongate slot 15a together constitute a maximum pivotal displacement restricting means for the engine hood 12.

Figure 4A:
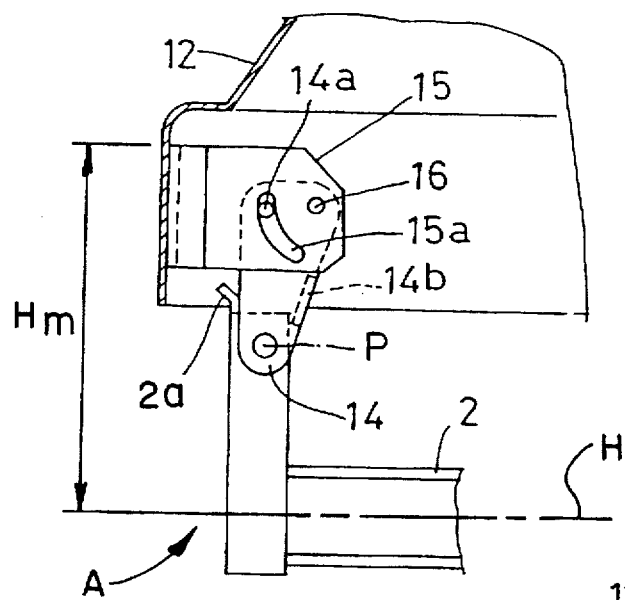
FIGS. 4a to 4c are descriptive views showing pivotal conditions of an engine hood.
Figure 4B:
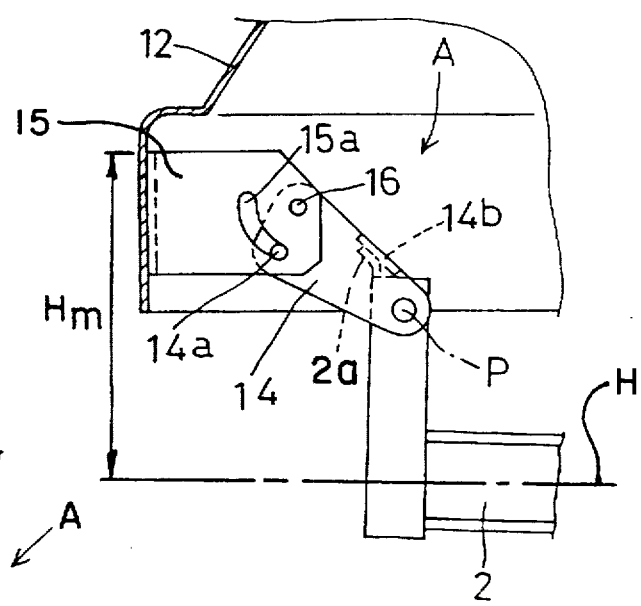
Figure 4C:
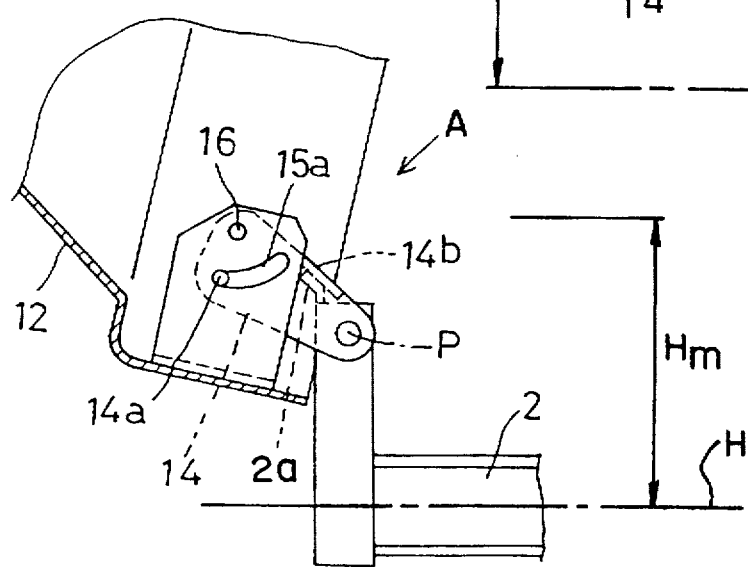
Figure 5:
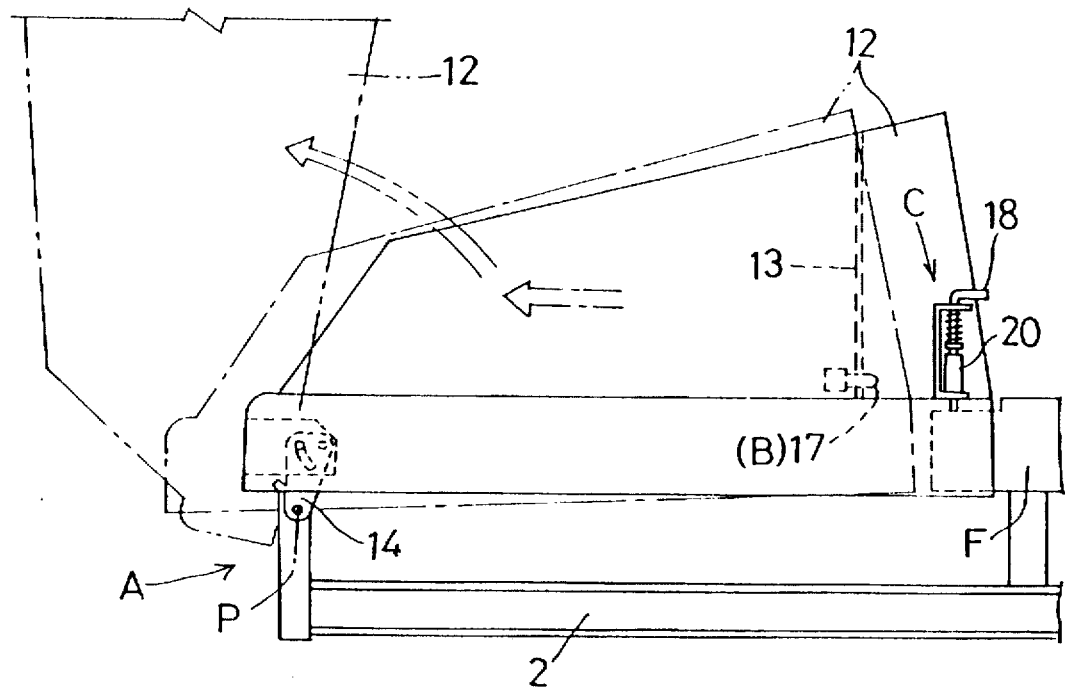
FIG. 5 is a side view of the engine hood.

The vehicle body or chassis 2 extends substantially along a horizontal reference line H shown in FIGS. 4a–4c. The connecting mechanism formed by support arm 14 connects the engine hood 12 with the vehicle chassis 2 such that the maximum vertical distance $H_m$ of the connecting mechanism from the reference line H with the engine hood 12 in the maximum displaced position in the forward or rearward direction of the vehicle chassis 2 shown in FIG. 4b is less than or equal to the maximum vertical distance $H_m$ of the connecting mechanism from the reference line H with the engine hood 12 in the closed position shown in FIG. 4a.

Next, a locking construction of the engine hood will be described.

As shown in FIGS. 2, 3, 5 and 6, adjacent an inner face of a side wall of the engine hood 12 on the the side of the opened end thereof, there are provided an engaging mechanism B for effecting restrictions of movement of the engine hood in the right and left direction and of the upward pivotal movement of the same and a lock mechanism C for restricting the movement of the engine hood 12 in the fore-and-aft direction of the vehicle body.

The engaging mechanism B includes an elastic engaging member 17 ('an engaging portion') comprised of a plate spring attached to the inner face of the side wall of the engine hood 12, and a mating square opening 13b ('an engaged portion') formed in the shield plate 13 as a member fixed to the vehicle body. In operation, as the elastic engaging member 17 comes into engagement with the square opening 13b in association with a movement of the engine hood 12 in the forward direction of the vehicle body, the right-to-left movement and upward pivotal movement of the engine hood 12 are restricted by this engagement. Incidentally, the engaging member 17 constituting the engaging portion is not limited to the elastic member such as described above, but may be a rigid projection instead.

In the above, it is preferred, in the condition of FIG. 4a, that the support arm 14 be oriented substantially perpendicular relative to the pivot axis P and that the engine hood 12 be moved in a substantially horizontal direction when the hood 12 is started to be moved toward the rear side of the vehicle body. That is, if it is attempted to upwardly pivot the hood 12 about the connecting pins 16 from the condition of FIG. 4a, this movement is stopped by the engaging mechanism B. And, this engaging mechanism B is released only when a force is applied to the engine hood 12 to move this along the fore-and-aft direction of the vehicle body.

Figure 6A:
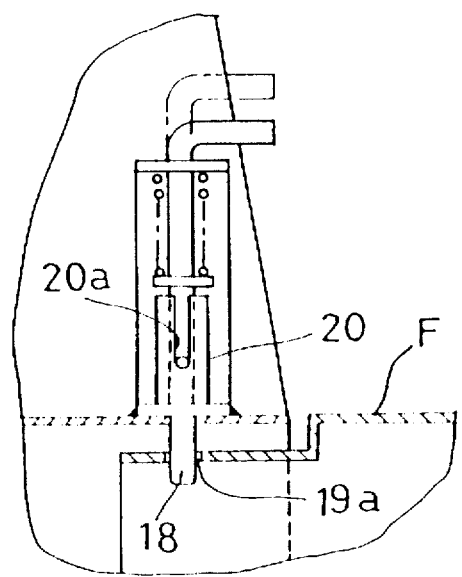
FIGS. 6a and 6b are a side view in a vertical section and a perspective view of a lock mechanism.
Figure 6B:
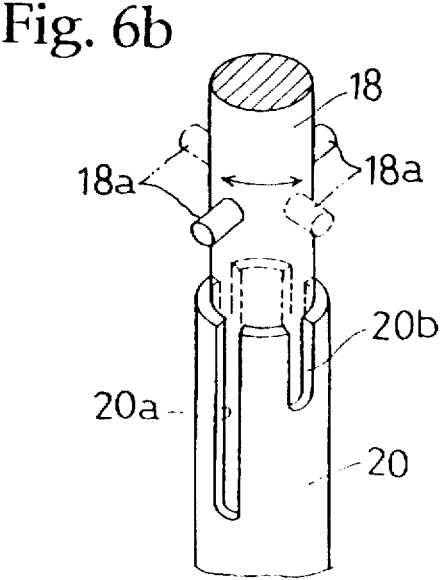

As shown in FIGS. 6a and 6b, the lock mechanism C includes a vertically extending lock pin 18, and a pin slot 19a into which the lock pin 18 may be inserted. In operation, when the lock pin 18 is inserted into the pin slot 19a, this prevents movement of the engine hood 12 in the fore-and-aft direction of the vehicle body 12.

The lock pin 18 may be maintained in position at two positions, i.e. at a locked position and a lock-released position. More particularly, the lock pin 18 includes a pair of radially and oppositely projecting engaging pins 18a, whereas, a cylindrical member 20 for supporting the pin 18 defines an engaging groove having a cross-like shape in the plan view. The cross-like engaging groove includes an opposed pair of vertically long engaging slits 20a as the engaging groove for the locked position and an opposed pair of vertically short engaging slits 20b as the further engaging groove for the lock-released position, respectively.

The foregoing embodiment discloses an engine hood for a rear-mounted engine. Instead, the engine hood may be for a front-mounted engine. That is, when the present invention is applied to a rear-mounted engine, the engine hood is disposed rearwardly of the driver's seat and the connecting mechanism A is disposed at the rear region of this engine hood. Whereas, when the invention is applied to a front-mounted engine, the engine hood is to be disposed forwardly of the driver's seat and the connecting mechanism A is to be disposed at a forward region of this engine hood.

Further, the work vehicle may be a tractor.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A work vehicle having an engine hood which may be opened and closed, said vehicle comprises:
   a connecting mechanism for connecting said engine hood with a vehicle body in such a manner as to allow said engine hood to be moved substantially in the forward or rearward direction relative to said vehicle body and then to allow an upward pivotal movement of said engine hood relative to said vehicle body, wherein said connecting member includes
   a first bracket pivotally attached to a vehicle chassis,
   a second bracket attached to said engine hood,
   a connecting member for pivotally interconnecting said first bracket and said second bracket,
   a first engaging pin,
   a second engaging pin extending from said first bracket, and
   an engaging hole and an engaging groove defined in said second bracket, said first engaging pin being pivotally inserted into said engaging hole and said second engaging pin being slidable within said engaging groove, respectively.

2. A work vehicle as claimed in claim 1, wherein said engaging groove includes an arcuate elongate slot extending peripherally about an axis of said first engaging pin.

3. A work vehicle as claimed in claim 2, wherein said vehicle chassis includes a contact portion for coming into contact with said first bracket so as to define a maximum displaced position of said engine hood in the fore-and-aft direction of said vehicle body.

4. A work vehicle as claimed in claim 3, wherein said engaging groove is formed in such a manner as to allow said engine hood to be pivotable about said first engaging pin when said engine hood reaches said maximum displaced position.

5. A work vehicle as claimed in claim 4, wherein said engaging groove is formed such that, in association with an upward pivotal movement of said engine hood from said maximum displaced position, said second engaging pin slides within said engaging groove, and arrival of said second pin at an end of said engaging groove defines a full opened position of said engine hood.

6. A work vehicle having an engine hood which may be opened and closed, said vehicle comprises:
   a connecting mechanism for connecting said engine hood with a vehicle body which extends substantially along a horizontal reference line in a forward/rearward direction of said vehicle body said connecting mechanism connecting said engine hood with said vehicle body in such a manner as to allow said engine hood to be moved substantially in the forward or rearward direction relative to said vehicle body from a closed position to a maximum displaced position in the forward or rearward direction of said vehicle body and then to allow an upward pivotal movement of said engine hood relative to said vehicle body after said engine hood has reached a maximum displaced position in the forward or rearward direction of said vehicle body, wherein a maximum vertical distance (Hm) of said connecting mechanism from said horizontal reference line of said vehicle body with said engine hood in said maximum displaced position in the forward or rearward direction of said vehicle body is less than or equal to a maximum vertical distance (Hm) of said connecting mechanism from said horizontal reference line of said vehicle body with said engine hood in said closed position; and
   a movement restricting mechanism for restricting movements of said engine hood under a closed condition in the right and left and upward directions relative to said vehicle body, said movement restricting mechanism includes an engaging portion fixedly provided on said engine hood and an engaged portion provided on said vehicle body for restricting movements of said engaging portion.

7. A work vehicle as claimed in claim 6, wherein said engaged portion includes an opening defined in a shield plate; wherein said engaging portion includes an engaging projection integrally formed on said engine hood and engageable into said opening when said engine hood is closed.

8. A work vehicle as claimed in claim 6, further including a lock mechanism for locking said engine hood at a closed condition thereof.

9. A work vehicle as claimed in claim 8, wherein said lock mechanism includes a lock pin fixedly attached to said engine hood and projectable and retractable in a cross sectional plane of said vehicle body, and a pin hole fixedly defined in said vehicle body into which said lock pin may be inserted.

10. A work vehicle as claimed in claim 6 wherein a dustproof mesh for a radiator is disposed in the vicinity of an opened end of said engine hood, and a distance between a pivotal axis of said first bracket relative to said vehicle body and a pivot axis of said second bracket, and wherein a maximum pivotal angle of said first bracket are determined such that said dustproof mesh is upwardly withdrawable when said engine hood is located at a maximum displaced position in the fore-and-aft direction of said vehicle body.

11. A work vehicle having an engine hood which may be opened and closed, said vehicle comprises:

a connecting mechanism for connecting said engine hood with a vehicle body in such a manner as to allow said engine hood to be moved substantially in the forward or rearward direction relative to said vehicle body and then to allow an upward pivotal movement of said engine hood relative to said vehicle body after said engine hood has reached a maximum displaced position in the forward or rearward direction of said vehicle body; and a movement restricting mechanism for restricting movements of said engine hood under a closed condition in the right and left and upward directions relative to said vehicle body, said movement restricting mechanism includes an engaging portion fixedly provided on said engine hood and an engaged portion provided on said vehicle body for restricting movements of said engaging portion, wherein said engaged portion includes an opening defined in a shield plate; wherein said engaging portion includes an engaging projection integrally formed on said engine hood and engageable into said opening when said engine hood is closed, wherein said connecting mechanism includes a first bracket pivotally attached to a vehicle chassis, a second bracket attached to said engine hood, and a connecting member for pivotally interconnecting said first bracket and said second bracket;

wherein said connecting member includes a first engaging pin and a second engaging pin extending from said first bracket, and an engaging hole and an engaging groove defined in said second bracket, said first engaging pin being pivotally inserted into said engaging hole and said second engaging pin being slidable within said engaging groove, respectively.

12. A work vehicle as claimed in claim 11, wherein said engaging groove includes an arcuate elongate slot extending peripherally about an axis of said first engaging pin.

13. A work vehicle as claimed in claim 12, wherein said vehicle chassis includes a contact portion for coming into contact with said first bracket so as to define said maximum displaced position of said engine hood in the fore-and-aft direction of said vehicle body.

14. A work vehicle as claimed in claim 13, wherein said engaging groove is formed in such a manner as to allow said engine hood to be pivotable about said first engaging pin when said engine hood reaches said maximum displaced position.

15. A work vehicle as claimed in claim 14, wherein said engaging groove is formed such that, in association with an upward pivotal movement of said engine hood from said maximum displaced position, said second engaging pin slides within said engaging groove, and arrival of said second pin at an end of said engaging groove defines a full opened position of said engine hood.

16. A work vehicle having an engine hood which may be opened and closed, said vehicle comprises:

a connecting mechanism for connecting said engine hood with a vehicle body in such a manner as to allow said engine hood to be moved in the forward or rearward direction relative to said vehicle body and then to allow an upward pivotal movement of said engine hood relative to said vehicle body;

wherein said connecting mechanism includes a first bracket pivotally attached to a vehicle chassis, a second bracket attached to said engine hood, and a connecting member for pivotally interconnecting said first bracket and said second bracket; and wherein said connecting member includes maximum forward-rearward displacement restricting means for defining a limit of the pivotal movement of said first bracket relative to said vehicle body, maximum pivotal displacement restricting means for defining a limit of the pivotal movement of said second bracket relative to said first bracket, said vehicle further includes a movement restricting mechanism for restricting movements of said engine hood under a closed condition in the right and left and upward directions relative to said vehicle body, wherein said movement restricting mechanism includes an engaging portion fixedly provided on said engine hood and an engaged portion provided on said vehicle body for restricting movements of said engaging portion wherein said maximum forward-rearward displacement restricting means includes a stopper formed integrally with said first bracket and a contact portion for coming into contact with said stopper to define the limit of the pivotal movement of said first bracket; wherein said second bracket includes a first engaging pin acting as a pivot axis for the pivotal movement of said second bracket relative to said first bracket and also a second engaging pin which is slidable within an engaging groove defined in said second bracket; and wherein said maximum pivotal displacement restricting means comes into contact with one end of said engaging groove to realize a maximum opened condition of said engine hood.

17. A work vehicle as claimed in claim 16, further including a lock mechanism for locking said engine hood at the closed condition thereof; said lock mechanism including a lock pin fixedly provided on said engine hood and projectable and retractable in a cross sectional plane of said vehicle body, and a pin hole fixedly defined in said vehicle body into which said lock pin may be inserted.

18. A work vehicle as claimed in claim 16, wherein a dustproof mesh for a radiator is disposed in the vicinity of an opened end of said engine hood, and a distance between a pivotal axis of said first bracket relative to said vehicle body and a pivot axis of said second bracket, and wherein a maximum pivotal angle of said first bracket are determined such that said dustproof mesh is upwardly withdrawable when said engine hood is located at said maximum displaced position in the fore-and-aft direction of said vehicle body.

* * * * *